US 9,032,053 B2

(12) United States Patent
Kosuru et al.

(10) Patent No.: US 9,032,053 B2
(45) Date of Patent: May 12, 2015

(54) METHOD AND APPARATUS FOR UPGRADING COMPONENTS OF A CLUSTER

(75) Inventors: Yekesa Kosuru, Westford, MA (US); Anssi Juhani Alaranta, Medford, MA (US)

(73) Assignee: Nokia Corporation, Espoo (FI)

( * ) Notice: Subject to any disclaimer, the term of this patent is extended or adjusted under 35 U.S.C. 154(b) by 166 days.

(21) Appl. No.: 13/285,651

(22) Filed: Oct. 31, 2011

(65) Prior Publication Data

US 2012/0110150 A1     May 3, 2012

Related U.S. Application Data

(60) Provisional application No. 61/408,473, filed on Oct. 29, 2010.

(51) Int. Cl.
| | |
|---|---|
| *H04L 12/24* | (2006.01) |
| *G06F 9/445* | (2006.01) |
| *G06F 9/455* | (2006.01) |
| *G06F 15/177* | (2006.01) |
| *G06F 13/28* | (2006.01) |

(52) U.S. Cl.
CPC ............ *H04L 41/0863* (2013.01); *G06F 9/455* (2013.01); *G06F 15/177* (2013.01); *G06F 13/28* (2013.01); *H04L 41/082* (2013.01); *H04L 41/0893* (2013.01); *G06F 8/65* (2013.01)

(58) Field of Classification Search
CPC ......... G06F 15/177; G06F 9/44; G06F 11/30; G06F 9/455; G06F 13/28; H04M 1/72525; H04L 41/0863

USPC ................ 709/221; 717/171; 714/47; 707/22
See application file for complete search history.

(56) References Cited

U.S. PATENT DOCUMENTS

| | | | | |
|---|---|---|---|---|
| 6,928,589 | B1 * | 8/2005 | Pomaranski et al. | ........ 714/47.2 |
| 7,206,852 | B2 * | 4/2007 | Ferguson et al. | ............. 709/229 |
| 7,237,243 | B2 * | 6/2007 | Sutton et al. | .................. 719/310 |
| 7,360,208 | B2 * | 4/2008 | Joshi et al. | ..................... 717/168 |
| 7,370,322 | B1 * | 5/2008 | Matena et al. | ................ 717/171 |
| 7,406,473 | B1 * | 7/2008 | Brassow et al. | ........................ 1/1 |
| 7,818,408 | B1 * | 10/2010 | Ignatuk et al. | ................ 709/221 |
| 7,865,893 | B1 * | 1/2011 | Omelyanchuk et al. | .......... 718/1 |
| 8,073,990 | B1 * | 12/2011 | Baron et al. | ..................... 710/22 |
| 8,171,466 | B2 * | 5/2012 | Langen et al. | ................ 717/170 |
| 8,244,924 | B2 * | 8/2012 | Butler et al. | ...................... 710/8 |
| 8,290,920 | B2 * | 10/2012 | Mahajan et al. | ............... 707/703 |
| 8,307,095 | B2 * | 11/2012 | Clark et al. | .................... 709/227 |
| 8,352,608 | B1 * | 1/2013 | Keagy et al. | ................... 709/226 |
| 8,413,133 | B2 * | 4/2013 | Sakurai et al. | ................ 717/171 |
| 8,555,273 | B1 * | 10/2013 | Chia et al. | ..................... 717/173 |
| 8,694,464 | B2 * | 4/2014 | Buban et al. | ................... 707/613 |
| 2003/0208569 | A1 * | 11/2003 | O'Brien et al. | ............... 709/221 |
| 2003/0233648 | A1 * | 12/2003 | Earl et al. | ...................... 717/176 |
| 2004/0056878 | A1 * | 3/2004 | Lau et al. | ...................... 345/706 |
| 2005/0204353 | A1 * | 9/2005 | Ji | ................................. 717/168 |
| 2006/0031420 | A1 * | 2/2006 | Ferguson et al. | ............. 709/219 |

(Continued)

*Primary Examiner* — O. C. Vostal

(74) *Attorney, Agent, or Firm* — Ditthavong & Steiner, P.C.

(57) ABSTRACT

An approach is provided for upgrading components of a cluster. One or more components of at least one server of a cluster of servers are determined to be upgraded. Status information of the cluster, the at least one server, or a combination thereof is determined. It is determined whether to initiate another upgrade of one or more other components of the at least one server, another one of the servers, or a combination thereof based, at least in part, on the status information.

20 Claims, 10 Drawing Sheets

(56) References Cited

U.S. PATENT DOCUMENTS

| | | | |
|---|---|---|---|
| 2007/0008884 A1* | 1/2007 | Tang | 370/230 |
| 2007/0192493 A1* | 8/2007 | Manolache et al. | 709/226 |
| 2007/0234332 A1* | 10/2007 | Brundridge et al. | 717/168 |
| 2008/0082665 A1* | 4/2008 | Dague et al. | 709/226 |
| 2008/0201694 A1* | 8/2008 | Goldberg et al. | 717/120 |
| 2008/0263535 A1* | 10/2008 | Dias et al. | 717/168 |
| 2009/0082051 A1* | 3/2009 | Ruotsi | 455/519 |
| 2009/0113411 A1* | 4/2009 | Halliday | 717/169 |
| 2009/0119655 A1* | 5/2009 | Quilty | 717/168 |
| 2009/0138523 A1* | 5/2009 | Pi et al. | 707/200 |
| 2009/0172142 A1* | 7/2009 | Hanai et al. | 709/223 |
| 2009/0240791 A1* | 9/2009 | Sakurai et al. | 709/221 |
| 2009/0265699 A1* | 10/2009 | Toeroe | 717/168 |
| 2009/0313630 A1* | 12/2009 | Hori | 718/102 |
| 2009/0328027 A1* | 12/2009 | Tsuchiya et al. | 717/171 |
| 2010/0030789 A1* | 2/2010 | Goto et al. | 707/10 |
| 2010/0154054 A1* | 6/2010 | Beck | 726/21 |
| 2010/0205541 A1* | 8/2010 | Rapaport et al. | 715/753 |
| 2010/0217837 A1* | 8/2010 | Ansari et al. | 709/218 |
| 2010/0222048 A1* | 9/2010 | Madej et al. | 455/418 |
| 2011/0004680 A1* | 1/2011 | Ryman | 709/224 |
| 2011/0029880 A1* | 2/2011 | Neuse et al. | 715/735 |
| 2011/0099266 A1* | 4/2011 | Calder et al. | 709/224 |
| 2011/0126047 A1* | 5/2011 | Anderson et al. | 714/15 |
| 2011/0202917 A1* | 8/2011 | Laor | 718/1 |
| 2012/0102163 A1* | 4/2012 | Witt et al. | 709/221 |

* cited by examiner

[ROOT@DUTL-20 ~]# STACK STATUS -X

| HOST 601 | STATUS 603 | UPDATED 605 | PATCHED 607 | REVISION 609 | DESCRIPTION 611 |
|---|---|---|---|---|---|
| LOCALHOST 613 | ONLINE | 05/26/10 (OK) | YES | | |
| DUTL-21 | ONLINE | 05/26/10 (OK) | YES | 493 | 1.0.0_ALPHA1 |
| DUTL-22 | ONLINE | 05/26/10 (OK) | YES | 493 | 1.0.0_ALPHA1 |
| DUTL-23 | ONLINE | 05/26/10 (OK) | YES | 493 | 1.0.0_ALPHA1 |
| DUTL-24 | ONLINE | 05/26/10 (OK) | YES | 493 | 1.0.0_ALPHA1 |

[ROOT@DUTL-20 ~]#

```
[ROOT@DUTL-20 ~]# CD /OPT/LOCAL/BIN/
[ROOT@DUTL-20 BIN] # LS
CLUSTER-HEALTH-CHECK    ROLLING-UPGRADE
[ROOT@DUTL-20 BIN] #     ./ROLLING-UPGRADE
PERFORMING VSHARDS CLUSTER HEALTH CHECK...OK

PERFORMING PUPPET HEALTH CHECK ON ALL NODES SIMULTANEOUSLY      ⎫
UPDATING DUTL-21.US.MSUDEV.NOKLAB.NET...                         ⎬ 701
UPDATING DUTL-23.US.MSUDEV.NOKLAB.NET...                         ⎪
UPDATING DUTL-24.US.MSUDEV.NOKLAB.NET...                         ⎭

UPGRADING SERVERS ONE-BY-ONE                                     ⎫
UPGRADING DUTL-21.US.MSUDEV.NOKLAB.NET...                        ⎪
PERFORMING VSHARDS CLUSTER HEALTH CHECK...                       ⎪
UPGRADING DUTL-23.US.MSUDEV.NOKLAB.NET...                        ⎬ 703
PERFORMING VSHARDS CLUTER HEALTH CHECK...                        ⎪
UPGRADING DUTL-24.US.MSUDEV.NOKLAB.NET...                        ⎪
PERFORMING VSHARDS CLUTER HEALTH CHECK...                        ⎭

ALL NODES WHERE SUCCESSFULLY UPGRADED                            ⎫
PERFORMING FINAL VSHARDS CLUSTER HEALTH CHECK...OK               ⎬ 705
MARKING CRITICAL ARTIFACTS FOR ROLLBACK                          ⎭
UPDATING DUTL-21.US.MSUDEV.NOKLAB.NET...                         ⎫
UPDATING DUTL-23.US.MSUDEV.NOKLAB.NET...                         ⎬ 707
UPDATING DUTL-24.US.MSUDEV.NOKLAB.NET...                         ⎭

HOST          STATUS    UPDATED           PATCHED   REVISION   DESCRIPTION

LOCALHOST     ONLINE    07/26/10 (OK)
DUTL-21       ONLINE    07/26/10 (OK)     YES       552        1.0.0_170
DUTL-23       ONLINE    07/26/10 (OK)     YES       552        1.0.0_170
DUTL-24       ONLINE    07/26/10 (OK)     YES       552        1.0.0_170
[ROOT@DUTL-20 BIN] # □
```

METHOD AND APPARATUS FOR UPGRADING COMPONENTS OF A CLUSTER

RELATED APPLICATIONS

This application claims the benefit of the earlier filing date under 35 U.S.C. §119(e) of U.S. Provisional Application Ser. No. 61/408,473 filed Oct. 29, 2010, entitled "Method and Apparatus for Upgrading Components of a Cluster," the entirety of which is incorporated herein by reference.

BACKGROUND

Service providers and device manufacturers (e.g., wireless, cellular, etc.) are continually challenged to deliver value and convenience to consumers by, for example, providing compelling network services. These services are generally implemented utilizing one or more servers. For example, these services can be implemented via one or more computer clusters. More and more services are being made available across various devices. As such, the clusters implementing the services are updated and maintained. However, maintenance can require downtime that the consumers as well as the providers of the services would like to avoid. Technical challenges exist in quickly and efficiently updating and/or maintaining services while reducing any potential downtime.

SOME EXAMPLE EMBODIMENTS

Therefore, there is a need for an approach for upgrading components of a cluster.

According to one embodiment, a method comprises determining to initiate an upgrade of one or more components of at least one server of a cluster of servers. The method also comprises determining status information of the cluster, the at least one server, or a combination thereof. The method further comprises determining whether to initiate another upgrade of one or more other components of the at least one server, another one of the servers, or a combination thereof based, at least in part, on the status information.

According to another embodiment, an apparatus comprises at least one processor, and at least one memory including computer program code, the at least one memory and the computer program code configured to, with the at least one processor, cause, at least in part, the apparatus to determine to initiate an upgrade of one or more components of at least one server of a cluster of servers. The apparatus is also caused to determine status information of the cluster, the at least one server, or a combination thereof. The apparatus is further caused to determine whether to initiate another upgrade of one or more other components of the at least one server, another one of the servers, or a combination thereof based, at least in part, on the status information.

According to another embodiment, a computer-readable storage medium carries one or more sequences of one or more instructions which, when executed by one or more processors, cause, at least in part, an apparatus to determine to initiate an upgrade of one or more components of at least one server of a cluster of servers. The apparatus is also caused to determine status information of the cluster, the at least one server, or a combination thereof. The apparatus is further caused to determine whether to initiate another upgrade of one or more other components of the at least one server, another one of the servers, or a combination thereof based, at least in part, on the status information.

According to another embodiment, an apparatus comprises means for determining to initiate an upgrade of one or more components of at least one server of a cluster of servers. The apparatus also comprises means for determining status information of the cluster, the at least one server, or a combination thereof. The apparatus further comprises means for determining whether to initiate another upgrade of one or more other components of the at least one server, another one of the servers, or a combination thereof based, at least in part, on the status information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6 and 7 are diagrams of status information received by a management platform during upgrade of a cluster, according to various embodiments;

DESCRIPTION OF SOME EMBODIMENTS

Examples of a method, apparatus, and computer program for upgrading a cluster are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
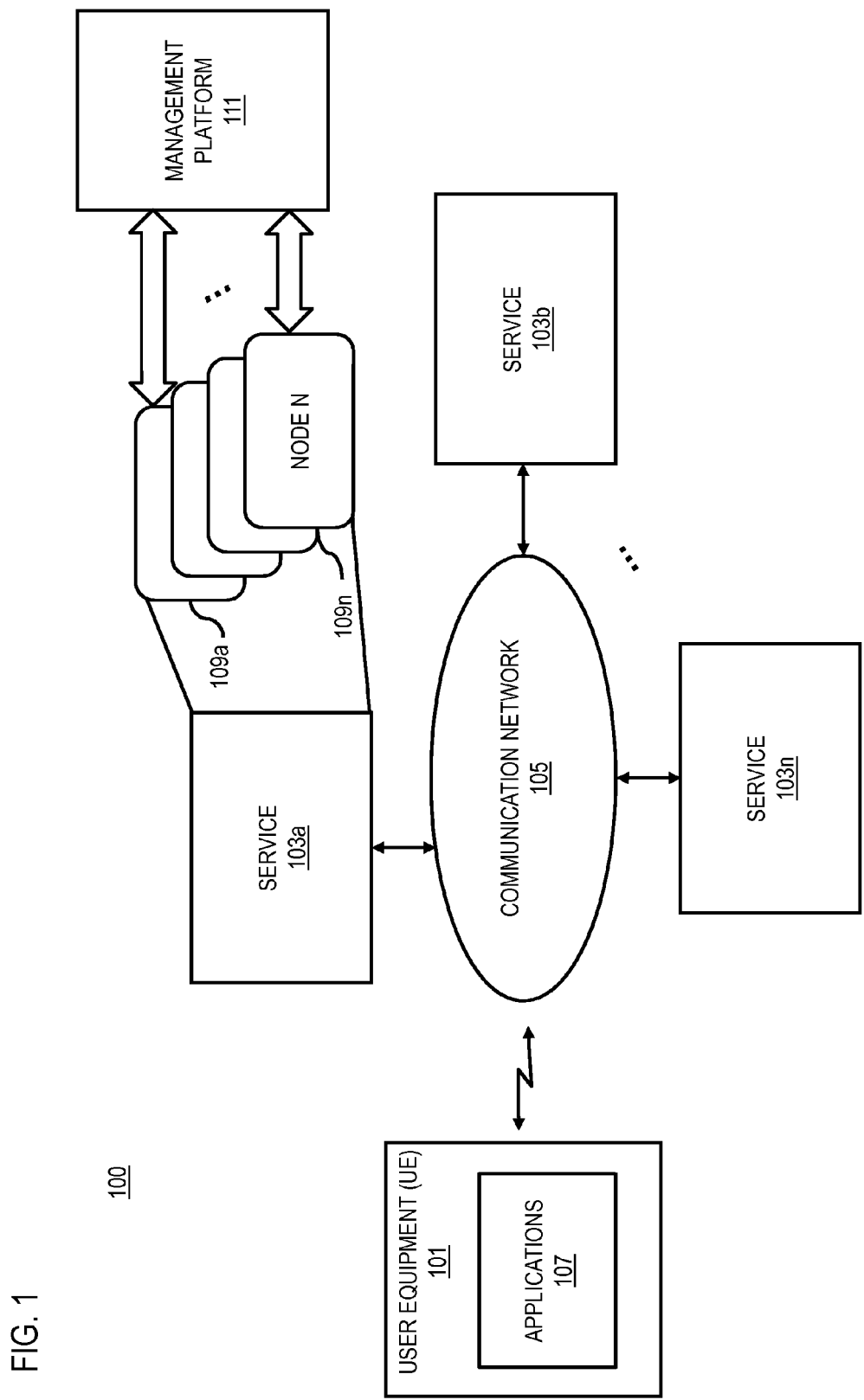
FIG. 1 is a diagram of a system capable of utilizing services implemented via clusters, according to one embodiment.

FIG. 1 is a diagram of a system capable of utilizing services implemented via clusters, according to one embodiment. Services can be provided to users of devices via the clusters. These clusters may execute the services utilizing one or more technologies, such as the XenServer™, Structured Query Language (SQL), shard database architecture, etc. As previously noted, these clusters should be maintained and upgraded. Challenges to such upgrades and maintenance include downtime of use of the clusters and/or individual nodes associated with the clusters. In certain embodiments, a cluster is a group of linked computers (e.g., server nodes) working together to complete tasks. As such, in many respects, the cluster forms a single computer. Different technologies can be utilized to implement clusters, for example, clusters can be created by connecting nodes to a fast Local Area Network (LAN).

An approach to upgrading nodes of a cluster involves clusters of nodes that have redundancy capabilities. As such, if one node is down for maintenance, another node can still provide the service to external users. Such a rolling upgrade can be implemented by failing over the load of a node to be upgraded to another node. Then, the node can be upgraded. Once the upgrade is complete, the load can be failed over to the upgraded node. In this manner, the cluster is not offline during the upgrade. Often, an upgrade of a cluster can take time because each node associated with the cluster takes a certain amount of time and the cluster can include many nodes. Further, as the cluster is being upgraded, the nodes may be at different software levels, which may not be compatible with certain other software levels. Technical challenges exist in upgrading such clusters efficiently while maintaining compatibility of software levels.

To address this problem, a system 100 of FIG. 1 introduces the capability to upgrade clusters while allowing continuous use of services provided by the respective clusters. As shown, user equipment (UEs) 101 can utilize one or more services 103a-103n via a communication network 105. Applications 107 associated with the UE 101 can be used by the user to access the services 103 via one or more protocols. It would be beneficial for service providers associated with the services 103 to provide continuous service, even while maintenance is being performed on one or more nodes 109 of a cluster providing the service 103.

As further detailed in FIGS. 2-5, the nodes 109 of a cluster can be upgraded while the cluster provides the service. A management platform 111 (e.g., a server, another computing device, etc.) can be utilized to upgrade one or more components of one or more clusters to a new software level. In certain embodiments, a component is a software module, configuration file, an artifact, or another file that may be upgraded. The management platform 111 can determine a cluster of machines (e.g., by looking up the cluster in a table associated with the service 103). In certain embodiments, the nodes 109 can include one server, in other embodiments; the nodes 109 can include multiple servers acting as a single node.

Then the management platform 111 can determine to apply an upgrade patch to the nodes. The patch can be applied to the nodes sequentially (e.g., serially, sequentially and parallel, etc.). Applying the patch serially and parallel can include upgrading more than one node while failing over the loads of the nodes to other nodes. When applying the patch to a node 109a, the management platform 111 can cause the node 109a to shutdown the software being upgraded. The shutdown procedure can include causing the node 109a to failover its workload to one or more other nodes 109b-109n. Then, the patch to another level of software (e.g., version 2) can be implemented on the node 109a. The node 109a then initiates execution of the other level of software. The other level of software can include compatibility with the previous software version (e.g., version 1) so as to work in harmony with the previous version. The initiation can also include a verification initiated by the management platform 111 to determine success of the upgrade and/or other status information. Further, initiating execution of the version 2 software can include failing over additional workload to the node 109a. Moreover, a checkpoint of the version 2 software can be conducted.

The management platform 111 can request the status of the node 109a. If the status indicates that there is an issue, the management platform 111 can perform actions to remedy the issue. Issues can include a failure of the upgrade to be successfully performed, a failure of a hardware component of the node 109a, a power failure, a memory corruption indication, a corruption in the patch, etc. The management platform 111 can attempt to remedy one or more of the issues. If the fault is detected, the management platform 111 can suspend application of the patch. Further, the management platform 111 can roll back other nodes 109 that have already been patched to a previous level to maintain compatibility integrity. This can be accomplished by returning the software level of the nodes 109 to version 1.

If the node 109a returns that the status of the node 109a is healthy or any fault has been remedied, the management platform 111 can continue upgrade of the cluster by performing the aforementioned process on other nodes 109. Optionally, a cluster check can be performed after each upgrade. With the cluster check, if an upgrade causes an error in the cluster, the nodes of the cluster can be rolled back to version 1. Version numbering is used for explanatory purposes and various version numbers, including sub version numbers can be utilized.

By way of example, the communication network 105 of system 100 includes one or more networks such as a data network (not shown), a wireless network (not shown), a telephony network (not shown), or any combination thereof. It is contemplated that the data network may be any local area network LAN, metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In certain embodiments, the UE 101 can be utilized as a terminal to manage one or more nodes 109 and/or the management platform 111.

By way of example, the UE 101 and services 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Further, communications between nodes 109 and/or the management platform 111 can be performed via one or more of the aforementioned protocols and/or technologies. Further, fast connections (e.g., gigabit Ethernet, fiber channel, etc.) can be utilized between nodes of a cluster, the management platform 111, etc.

In one embodiment, the location services 103 may interact according to a client-server model with the applications 107 of the UE(s) 101. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. A cluster of nodes 109 can perform the service 103. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
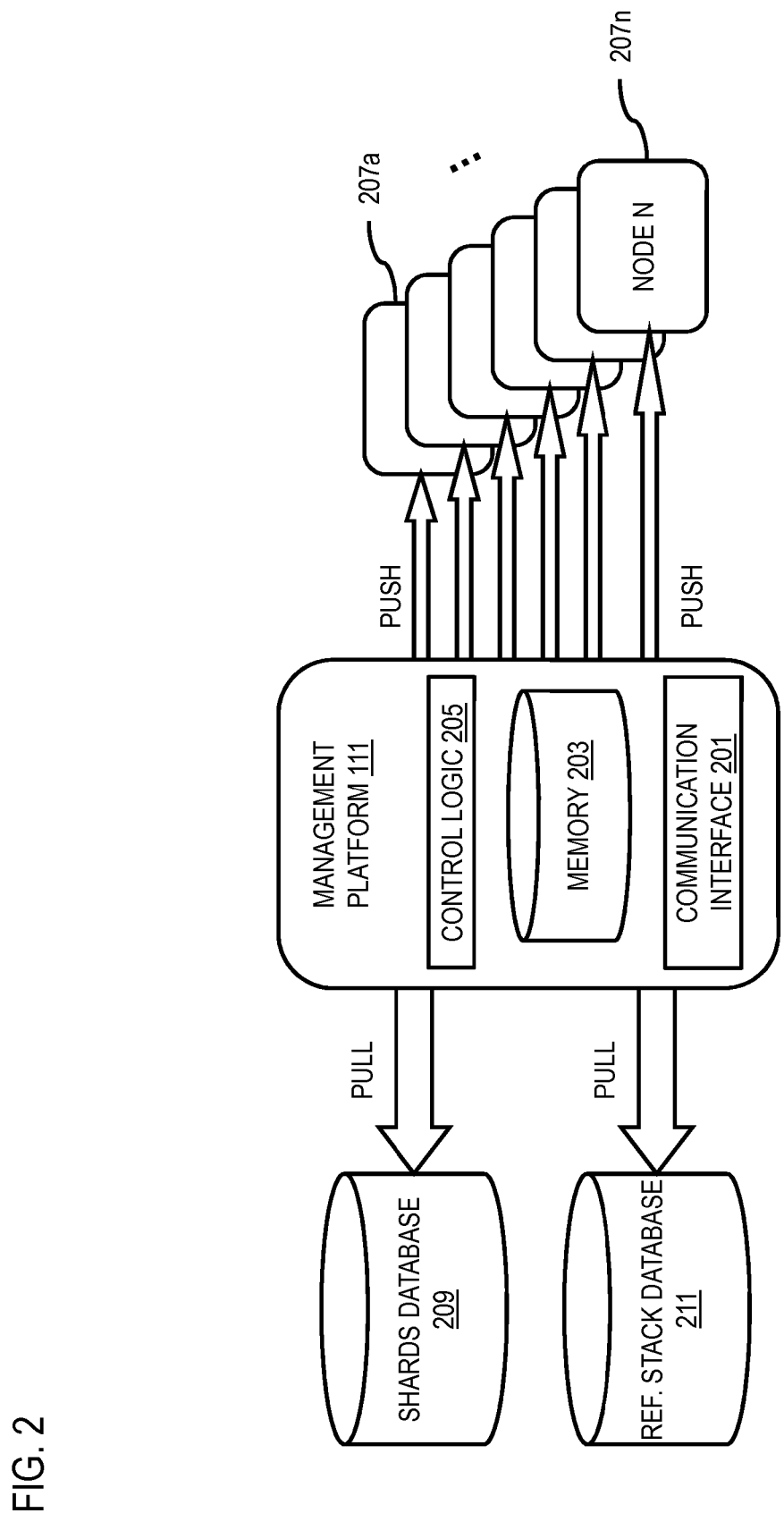
FIGS. 2-3 are diagrams of systems capable of upgrading components of a cluster, according to various embodiments.

FIG. 2 is a diagram of a system capable of upgrading components of a cluster, according to one embodiment. The system includes a diagram of the components of the management platform 111, according to one embodiment. By way of example, the management platform 111 includes one or more components for upgrading one or more nodes of one or more clusters. It is contemplated that the functions of these components may be combined in one or more components or performed by other components of equivalent functionality. In this embodiment, the management platform 111 includes a communication interface 201, memory 203, and control logic 205.

Control logic 205 of the management platform 111 can retrieve update patches from one or more databases via a communication interface 201 and push the upgrade patches to one or more nodes 207a-207n of one or more clusters. The one or more databases can be utilized for upgrading one or more software components of the nodes 207. For example, the databases can include a shard computing software database 209, a reference stack database 211, or the like. The databases 209, 211 can be stored in one or more formats. Such formats can include Apache Subversion™ (SVN), Concurrent Versions System (CVS), or the like. The control logic 205 can pull software upgrade versions from the databases 209, 211 and push the upgrades to the nodes via the communication interface 201.

In one embodiment, the management platform 111 can monitor the databases 209, 211. A checksum (e.g., an MD5 checksum) can be performed against one or more components (e.g., artifacts, configuration files, etc.) on the management platform 111 (e.g., stored in a volatile and/or non-volatile memory 203) and/or the nodes 207 of one or more associated clusters. The checksum can be compared to a checksum pulled from the databases 209, 211 by the control logic 205. If any of the files are changed, the upgrade is performed on the nodes 207.

Figure 3:
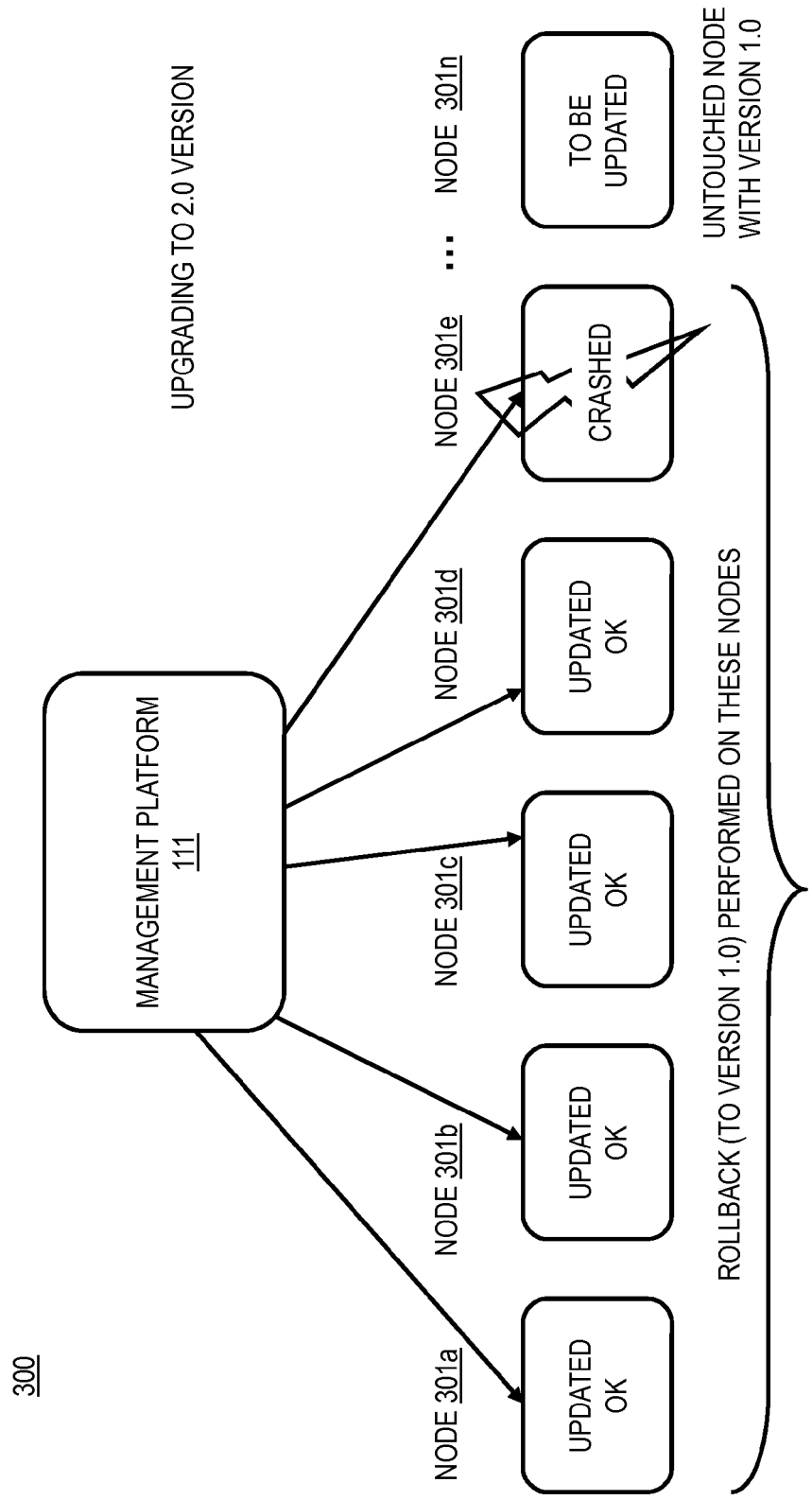

FIG. 3 is a diagram of a system capable of upgrading components of a cluster, according to one embodiment. The system 300 shows the process of upgrading a cluster of nodes 301a-301n. As previously noted, a sequential upgrade can be performed, e.g., as further detailed in FIGS. 4 and 5. The sequential upgrade can start with node 301a and be scheduled for updating to node 301n. Moreover, a cluster health check of the nodes 301 can be performed as a precursor to the upgrade. Utilizing this approach, before any upgrade is initiated, the status of nodes 301 can be determined to ensure that the management platform 111 has access to the nodes 301 and/or can communicate with the nodes 301 to perform the upgrade. In this example scenario, once the upgrade is initiated, the management platform 111 detects a crash (e.g., an error in the upgrade process, an unrelated error in node 301e, etc.) in node 301e.

The detection of the crash at node 301e causes a halt to the sequential upgrade process. The updated nodes 301a-301d and/or the upgrading node 301e can then be rolled back to a previous version. The previous version can be the same version executing on non-updated nodes (e.g., node 301n.). In this manner, only nodes 301a-301e affected by the upgrade are rolled back. Further, with this approach, the versions of the nodes are consistent, allowing for current and future compatibility. In certain scenarios, the next version (e.g., update version) of a particular component can be backwards compatible with the immediately preceding version. Further, in certain scenarios, the management platform 111 is not rolled back, thereby allowing for quick future upgrades.

Figure 4:
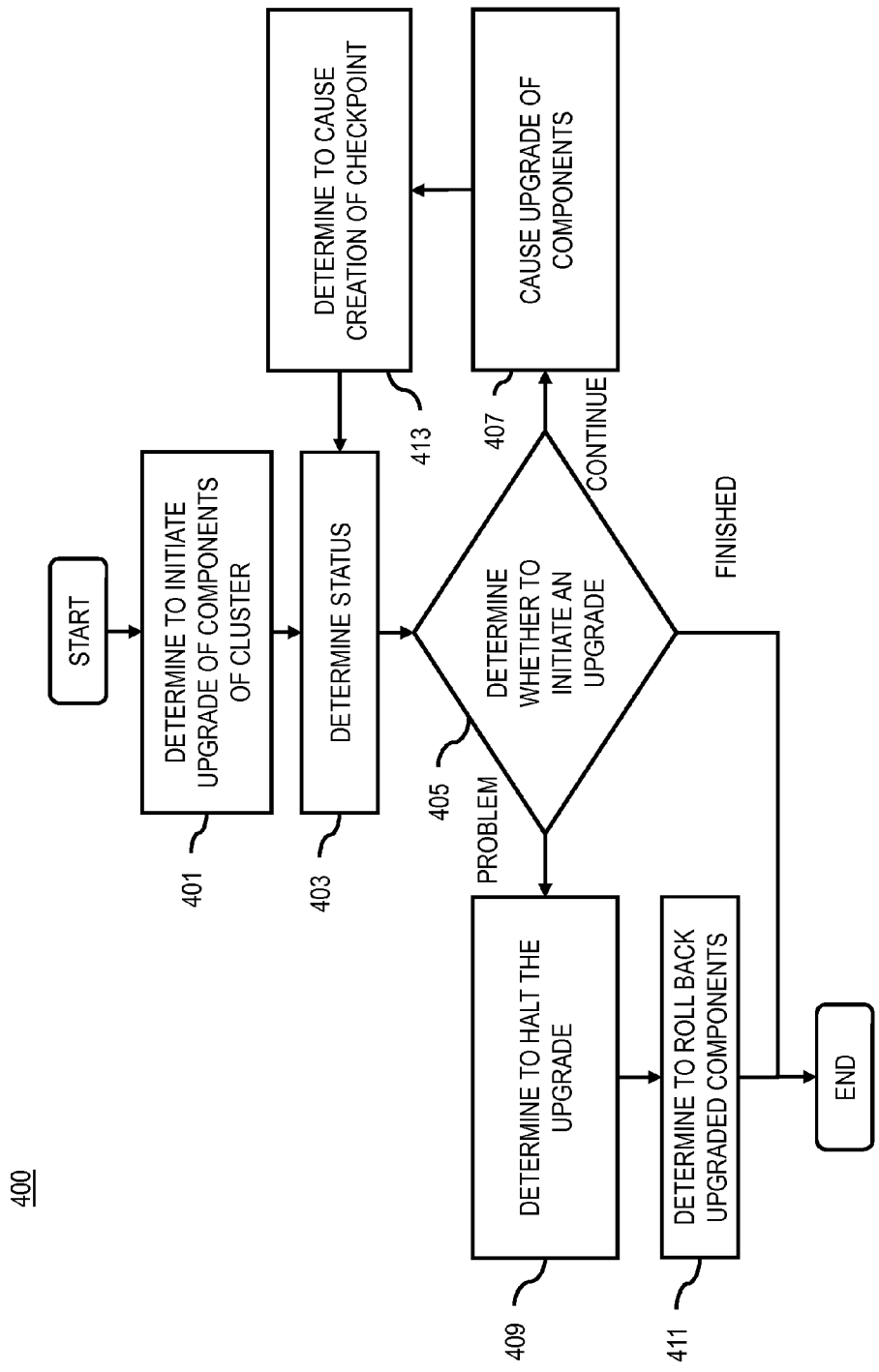
FIGS. 4-5 are flowcharts of processes for upgrading components of a cluster, according to various embodiments.
Figure 9:
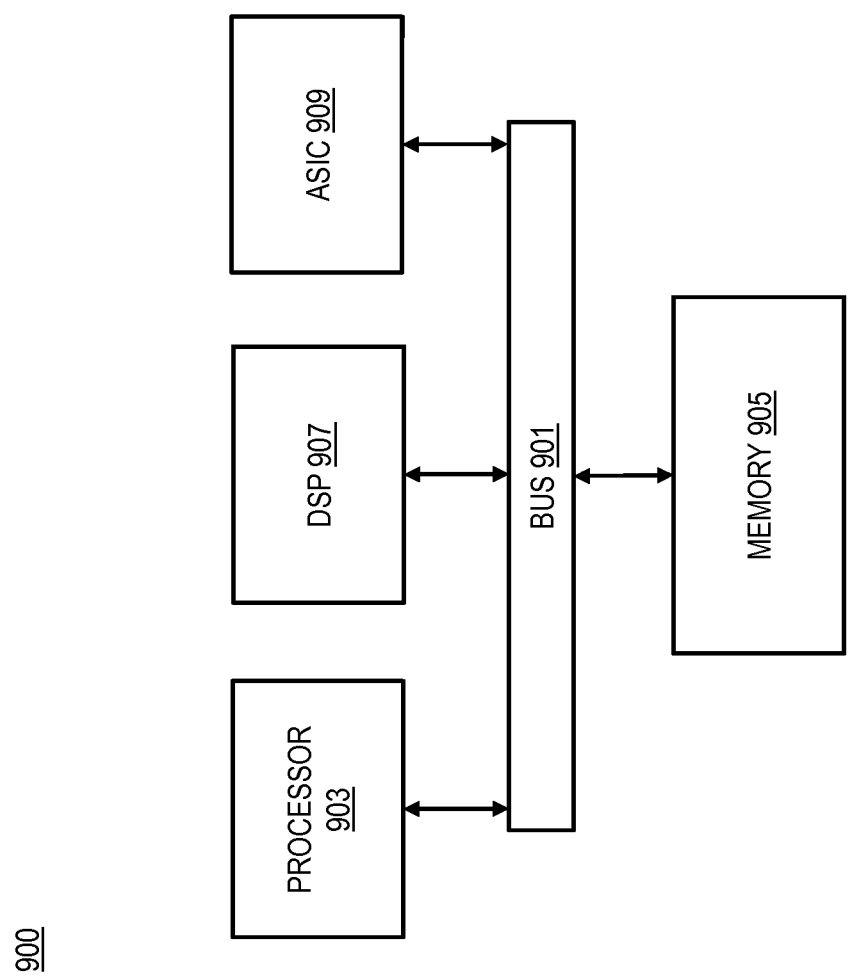
FIG. 9 is a diagram of a chip set that can be used to implement an embodiment of the invention.

FIG. 4 is a flowchart of a process for upgrading components of a cluster, according to one embodiment. In one embodiment, control logic 205 of the management platform 111 performs the process 400 and is implemented in, for instance, a chip set including a processor and a memory as shown in FIG. 9. Additionally or alternatively, one or more portions of the process 400 can be implemented via another device (e.g., one or more nodes 207 of a cluster). The control logic 205 and/or other devices can be utilized as means for implementing one or more steps of the process 400.

At step 401, the control logic 205 determines to initiate an upgrade of one or more components of at least one server of a cluster of servers. The determination can occur by the control logic 205 monitoring and/or querying a database (e.g., a revision control database such as a shards database 209, a reference stack database 211, or the like). As previously noted, if there is a change in the version of a component of the database, compared to the version in the memory 203 of the management platform 111 and/or nodes 207, the control logic 205 can determine to upgrade the nodes to that component version. Other manners of determining to upgrade a component can be utilized. For example, when the database is updated, a signal can be sent to the control logic 205 and the control logic 205 can determine to initiate upgrade based on the signal. Further, the control logic 205 may determine one or more clusters, including the cluster, and/or one or more nodes of the clusters to upgrade based on one or more tables, data structures, databases, or the like. For example, a table may indicate the current software level of each component of each of the nodes. Additionally or alternatively, the control logic 205 can determine to disable any ability to resume the sequential upgrade process after a predetermined period of time.

At step 403, the control logic 205 determines status information of the cluster, at least one node (e.g., a server), or a combination. The status information can be determined by querying each node of the cluster for their status. The queries can occur in parallel. Further, the queries can include a control aspect. For example, the query may request that the node perform a function (e.g., send a particular response). In this manner, the control logic 205 can be ensured that the control logic 205 has access to the node. Further, the status information can include version levels of one or more components of the nodes.

As such, the control logic 205 can determine a topology associated with the cluster (e.g., which nodes can fail over to other nodes, etc.). When determining to upgrade one or more nodes of the cluster, the upgrade process can be based on the topology. For example, an order can be determined based on the functionality of one or more of the nodes. Additionally, the topology can include one or more domains of nodes of the clusters that can be utilized in determining the sequence to upgrade. For example, the sequence can include a chain of domains, where the domains are upgraded one by one. As such, in certain scenarios, the upgrade process 400 for a cluster may be utilized for each domain. In other embodiments, the cluster can be upgraded in parallel based on the domain. In these embodiments, each domain can be upgraded in parallel while nodes of the domain are upgraded sequentially. Further, with the network topology, a head node associated with each domain can be utilized to generate a health status of a domain and/or cluster.

Moreover, the status information can include information about a connectivity status among the cluster, nodes of the cluster, other nodes of other clusters, the management platform 111, or combinations thereof. An operational status of the one or more components selected for upgrade and/or other components can also be collected as status information.

Then, at step 405, the control logic 205 determines whether to initiate an upgrade or another upgrade of one or more of the components of the nodes, other nodes of other clusters, or combinations thereof based, at least in part, on the status information. This step can initiate a first upgrade of one or more components. Further, this step can initiate further upgrades of subsequent components on other nodes. For example, the upgrade(s) can be associated with a sequential upgrade process. Thus, the nodes determined in step 401 to be upgraded can be upgraded one by one. The determination to upgrade a particular one of the nodes based on the status information can be based on whether the control logic 205 has access to the components of the particular node and/or based on a determination of whether the upgrade process of previously upgraded nodes of the cluster were successful. If the previous upgrades were successful and the health of the cluster and/or node to be upgraded is ok, the upgrade may continue at step 407.

If the status information indicates an issue (e.g., the cluster is not working, access to the node(s) is unavailable, one or more nodes of the cluster failed, etc.), the control logic 205 can determine to halt the upgrade process (step 409). This determination can be made based, at least in part, on a prompt to a user. For example, the control logic 205 can generate a message requesting an input for specifying whether to continue, suspend, or abort the upgrade. This message can be sent to an administrative user and/or be presented to one or more users via an interface. A determination to halt the upgrade can be made based on the prompt or in response to the detection of the problem. Further, the control logic 205 may attempt to remedy the problem before halting the upgrade process. Moreover, if there is an error, the control logic 205 may determine whether to revert the upgrade of one or more components, one or more previously upgraded components, or a combination based, at least in part, on the status information (step 411). For example, the determination to roll back the upgraded components can occur if there was a problem or if there was a problem that could not be remedied.

If the status information indicates that the upgrade may continue, then, at step 407, the control logic 205 causes upgrade of the components on the node. To upgrade components, the node can first be caused to fail over its load to another node. Then, the component and/or a module utilizing the component can be shut down for the upgrade. The upgrade can then be implemented. Once the upgrade is implemented, the component and/or module utilizing the component can be reactivated. Further, the load or another load can be failed over back onto the upgraded machine. In certain embodiments, the upgrade component may have nested components within. In these embodiments, the nested components are shutdown, then the component is shut down. After that, the component is upgraded and restarted. Once the component is restarted, the nested components are restarted.

After upgrade, the control logic 205 can determine to cause creation of a checkpoint. In certain scenarios, a checkpoint is created after each upgrade for each node for easy rollback to the checkpoint if an error occurs. In other scenarios, the checkpoint is created after each node of a cluster is upgraded. A checkpoint may be a snapshot of the current state of the nodes. Creating a checkpoint after each node is upgraded can be utilized to quickly return the node to the upgraded state after a failed upgrade process (which can include a rollback to a previous checkpoint).

Moreover, if the status information at step 405 indicates that the upgrade is complete, the upgrade process can end. Completion may be determined based on a predetermined number of the components to upgrade and/or nodes to upgrade based on step 401. Further, the control logic 205 may determine that a sequential upgrade of the nodes is substantially complete based, at least in part, on whether the predetermined number of components and/or nodes is upgraded. The amount of nodes and/or components upgraded can be incremented with each successful upgrade.

Figure 5:
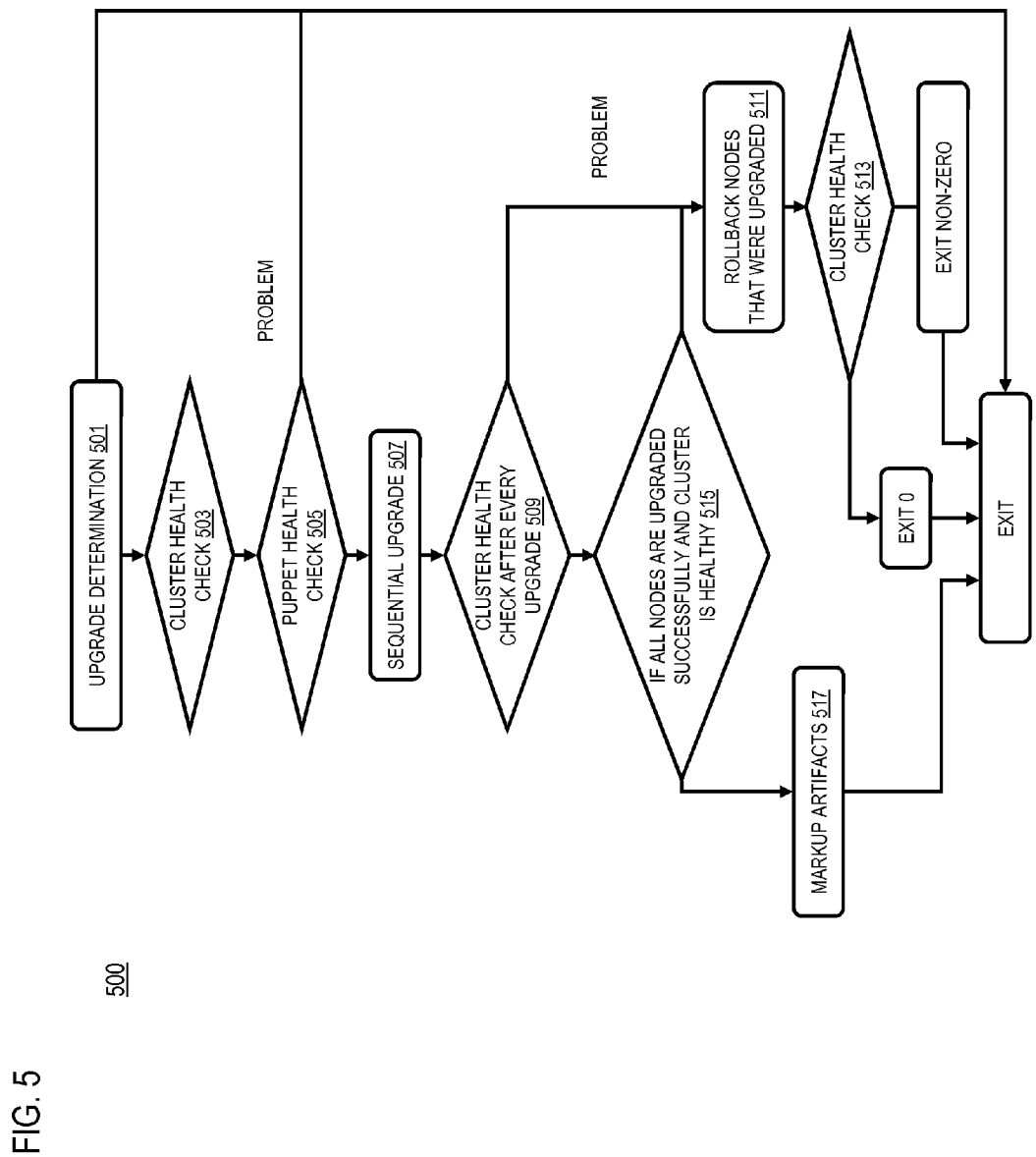

FIG. 5 is a flowchart of a process for upgrading components of a cluster, according to one embodiment. In one embodiment, control logic 205 of the management platform 111 performs the process 500 and is implemented in, for instance, a chip set including a processor and a memory as shown in FIG. 9. Additionally or alternatively, one or more portions of the process 500 can be implemented via another device (e.g., one or more nodes 207 of a cluster). The control logic 205 and/or other devices can be utilized as means for implementing one or more steps of the process 500.

At step 501, the control logic 205 can determine to upgrade a cluster of nodes based on an event. If the determination is not to upgrade (e.g., based no need for upgrade based on the event), the upgrade process 500 exits. If a determination is made to upgrade the cluster, the health status of the cluster is checked (step 503). The health status of the cluster can be determined by querying the nodes of the cluster, components of the nodes, or a head node associated with the cluster or a domain of clusters, the head node having access to the health status of individual nodes. Further, a puppet health check can be performed on the nodes of the cluster (step 505). The puppet health check can, in certain examples, be a check to determine if the control logic 205 can execute puppet scripts on each of the nodes. Additionally or alternatively, a puppet health check can determine whether the control logic 205 can connect to system management functions of the nodes. The puppet health check can be performed in parallel on all of the nodes. If a problem is detected (e.g., if a single node is down and/or does not respond) in either the cluster health check 503 and/or the puppet health check 505, the upgrade will not proceed. Further, the health checks can include other checks, e.g., a check for disk space available on the nodes.

Then, at step 507, the control logic 205 can initiate a sequential upgrade to the nodes. The nodes can then be upgraded. In one scenario, an algorithm (e.g., Message-Digest algorithm 5 (MD5)) checksum can be performed against all components (e.g., artifacts) on the management platform 111 and on each node and/or one or more of the nodes. If the MD5 checksum determines that a change has occurred between the management platform 111 and a node, the service is stopped. The control logic 205 then extracts the respective component or artifact (e.g., tarballs). Then, the control logic 205 and/or node generate a symbolic link to utilize the extracted component or artifact. Next, the service is restarted. In certain embodiments, load is moved away from and/or moved back to the node when the service is stopped/started. One or more different control files can be utilized (e.g., a shards control file, a database control file (e.g., SQL control file), etc.). In certain embodiments, a shard service includes one or more different databases executing upon the service.

After each sequential upgrade, the control logic 205 performs a cluster health check (step 509). The cluster health check can be executed after each node is upgraded. This can be because if the cluster has a large number of nodes (e.g., in the hundreds or more), and each upgrade takes a particular amount of time, multiplied together, the upgrade can take hundreds of minutes or more. Further, there is a chance that while the system is being upgraded, the node being upgraded and/or another node may go down, in which cases the cluster, as a whole, is no longer healthy. If the cluster is no longer healthy, the nodes that were upgraded can be rolled back (step 511). A script can be utilized to determine which components need to be rolled back (e.g., if one or more components are upgraded at the same time). Once the rollback is completed, another cluster health check can be performed on the nodes (step 513). The cluster health check can be utilized to determine if the components were successfully rolled back and the cluster can execute without error. If there is an error (e.g., a power failure in a node), an administrator can be prompted to perform a check on the system. The upgrade program can then exit with an error (if, there is still a problem) or no error (if there is no longer an operational problem).

At step 515, if the upgrade is successful (e.g., if all of the nodes are upgraded successfully and the cluster is healthy), the control logic 205 can generate a checkpoint. The checkpoint can be accomplished by marking up artifacts and/or components (step 517). The upgraded and/or running versions of artifacts and/or components can be marked up. This checkpoint is determined so that for the next upgrade, if a rollback is invoked, then the rolling back step utilizes these marked up artifacts and/or components. A symbolic link can be generated for the marked up files and stored in a database associated with the respective nodes and/or the management platform 111. Once the checkpoints are created, the upgrade process 500 can be exited.

Additionally, in certain embodiments, the checkpoints can be determined after upgrade of each node. In these embodiments, if there is an error and the nodes are rolled back, the checkpoint can be utilized to roll the upgraded nodes forward in a quick manner.

FIGS. 6 and 7 are diagrams of status information received by a management platform during upgrade of a cluster, according to various embodiments. The status information can be stored via one or more data structures and/or presented to a user. Such a user can include an administrator of a service 103 utilizing a terminal. The status information diagram 600 includes columns including host 601, status 603, updated 605, patched 607, revision, 609, and description 611. The host column 601 can represent a list of the nodes of one or more clusters. The local host 613 can represent the management platform 111. The status column 603 can represent the online and/or offline status of the nodes. Online can represent that the local host can communicate with the node. Further, the updated column 605 displays the date and/or time of the last update with the status associated with the update. The update status can additionally include whether the update at the date and/or time was successful. The patched column 607 displays whether each of the packages on a particular server, node, or platform are up-to-date compared to the latest packages in a particular location (e.g., a database including update versions). The revision column 609, description column 611, or other columns can be utilized to show a component version. For example, the revision column 609 can show a reference stack revision number associated with the nodes while the description column shows a shard component version. Version information can include various descriptors including, for example, numbers and/or characters.

FIG. 7 shows status information relating to the upgrade of one or more nodes. A first status 701 can be presented associated with a puppet health check. A puppet health check can be performed on all nodes to be upgraded simultaneously. In one scenario, the health check can be a simple control and response. After the health check is performed, the nodes can be upgraded sequentially. The sequential upgrade information 703 can be presented as status information. As previously noted, a cluster health check can be performed after each successful upgrade. Once all of the nodes are successfully upgraded, a final cluster health check can be performed. The cluster health check status information 705 can also be presented. Additionally, the status information associated with checkpoints 707 can be collected and/or presented.

With the above approaches, cluster maintenance can be performed on nodes while allowing for the cluster to provide a service. As such, upgrades can be made to the nodes while reducing/eliminating downtime of services. Further, upgrades performed allow for the nodes to run at a particular software version during the upgrade process, creating uniformity and allowing for future rolling upgrades. Moreover, when the nodes have been upgraded to a newer version than the current acting version, the acting version can be reset to the lowest version installed on the nodes. To create version uniformity, if a failure occurs during the upgrade process, each of the nodes can be rolled back to the previous version. This allows for more consistent future rolling upgrades.

The processes described herein for upgrading components of a cluster may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
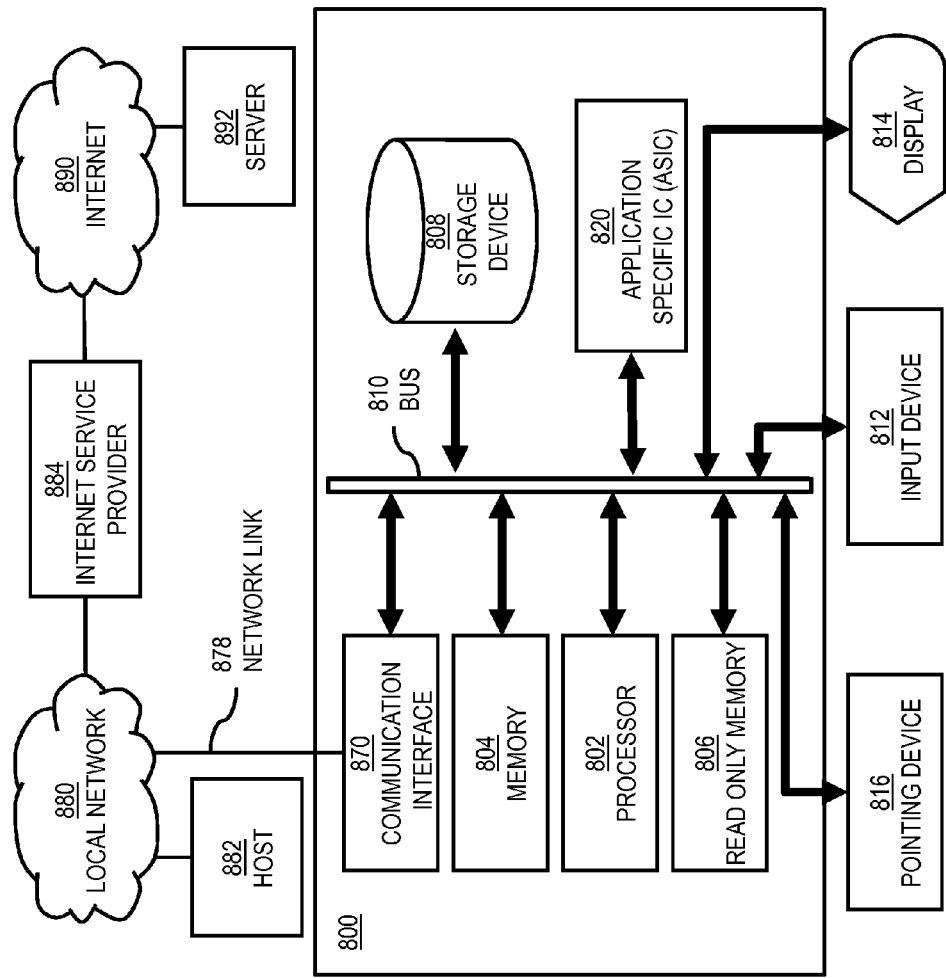
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to upgrade components of a cluster as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of upgrading components of a cluster.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to upgrade components of a cluster. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for upgrading components of a cluster. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for upgrading components of a cluster, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to upgrade components of a cluster as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of upgrading components of a cluster.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to upgrade components of a cluster. The memory 905 also stores the data associated with or generated by the execution of the inventive steps.

Figure 10:
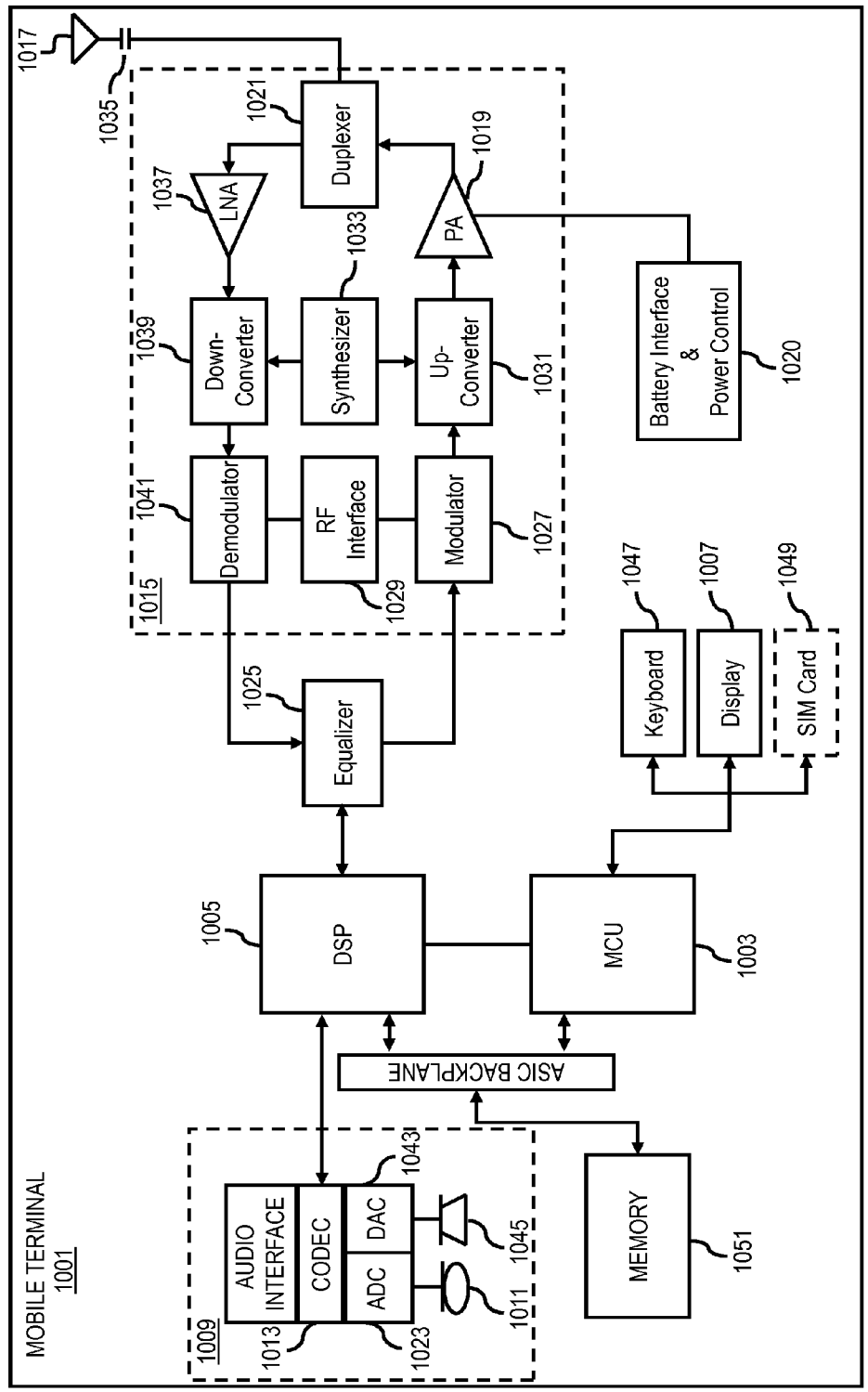
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of utilizing a service. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of utilizing a service that can be upgraded according to the processes discussed. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to utilize services. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination to initiate an upgrade of one or more components of a cluster of server nodes providing one or more services to user terminals per server node to one or more compatible software levels;

status information of the cluster, each of the server nodes, or a combination thereof; and at least one determination to transfer workload of providing the one or more services to the user terminals by one of the server nodes to another one of the server nodes of the cluster based, at least in part, on the status information and the at least one determination to initiate the upgrade of the one or more components, wherein at least one of the server nodes includes a virtual machine hypervisor host.

2. A method of claim 1, wherein the (1) data and/or (2) information and/or (3) at least one signal are further based, at least in part, on the following:

at least one determination to revert the upgrade of the one or more components, one or more previously upgraded components, or a combination thereof based, at least in part, on the status information including a failure of the upgrade, wherein at least one of the server nodes includes a plurality of servers acting as a single node to provide the one or more services to the user terminals.

3. A method of claim 1, wherein the (1) data and/or (2) information and/or (3) at least one signal are further based, at least in part, on the following:

at least one determination of performing a health check on the cluster based, at least in part, on the status information, wherein the health check of the cluster includes querying the each server node, components of the server nodes, a head node associated with the cluster or a domain of cluster, or a combination thereof, for health status information; and at least one determination of success of the upgrade based, at least in part, on the health check.

4. A method of claim 1, wherein the (1) data and/or (2) information and/or (3) at least one signal are further based, at least in part, on the following:
at least one determination to initiate another upgrade of one or more components of at least one other server of the cluster of server nodes,
wherein the upgrade, the another upgrade, or a combination thereof are part of a sequential upgrade process.

5. A method of claim 4, wherein the (1) data and/or (2) information and/or (3) at least one signal are further based, at least in part, on the following:
at least one determination of whether to suspend the sequential upgrade process based, at least in part, on the status information.

6. A method of claim 5, wherein the (1) data and/or (2) information and/or (3) at least one signal are further based, at least in part, on the following:
at least one determination to disable an ability to resume the sequential upgrade process after a predetermined period of time.

7. A method of claim 4, wherein the (1) data and/or (2) information and/or (3) at least one signal are further based, at least in part, on the following:
at least one determination that a predetermined number of the one or more components, a predetermined number of the server nodes, or a combination thereof have been upgraded; and
at least one determination that the sequential upgrade process is at least substantially complete is based, at least in part, on the determination with respect to the predetermined number of the one or more components, the predetermined number of the server nodes, or a combination thereof.

8. A method of claim 4, wherein the (1) data and/or (2) information and/or (3) at least one signal are further based, at least in part, on the following:
a topology of the cluster,
wherein the sequential upgrade process is based, at least in part, on the topology.

9. A method of claim 1, wherein the status information includes at least one of a connectivity status among the cluster, the each server node, the at least one other server, a management server, or a combination thereof and an operational status of the one or more components, the one or more other components, or a combination thereof, and
wherein the one or more components of a cluster of server nodes are upgraded per server node to one or more identical software versions.

10. A method of claim 4, wherein the (1) data and/or (2) information and/or (3) at least one signal are further based, at least in part, on the following:
at least one determination that the status information indicates an issue; and
at least one determination to generate a message requesting an input for specifying whether to continue, suspend, or abort the sequential upgrade process.

11. A method of claim 3, wherein the (1) data and/or (2) information and/or (3) at least one signal are further based, at least in part, on the following:
at least one determination of performing a puppet health check of the cluster via determining whether one or more puppet scripts are executed on the each server node, whether one or more system management functions of the nodes are connected to a upgrate platform, or a combination thereof; and
at least one determination of suspending the upgrade based, at least in part, on the puppet health check.

12. An apparatus comprising:
at least one processor; and
at least one memory including computer program code for one or more programs,
the at least one memory and the computer program code configured to, with the at least one processor, cause the apparatus to perform at least the following,
determine to initiate an upgrade of one or more components of at least one server of a cluster of server nodes providing one or more services to user terminals per server node to one or more compatible software levels;
determine status information of the cluster, each of the server nodes, or a combination thereof; and
determine to transfer workload of providing the one or more services to the user terminals by one of the server nodes to another one of the server nodes of the cluster based, at least in part, on the status information and the at least one determination to initiate the upgrade of the one or more components,
wherein at least one of the server nodes includes a virtual machine hypervisor host.

13. An apparatus of claim 12, wherein the apparatus is further caused to:
determine whether to revert the upgrade of the one or more components, one or more previously upgraded components, or a combination thereof based, at least in part, on the status information.

14. An apparatus of claim 12, wherein the apparatus is further caused to:
determine whether to perform a check point of the cluster, the each server node, or a combination thereof based, at least in part, on the status information.

15. An apparatus of claim 12, wherein the apparatus is further caused to:
determine to initiate another upgrade of one or more components of at least one other server of the cluster of server nodes,
wherein the upgrade, the another upgrade, or a combination thereof are part of a sequential upgrade process.

16. An apparatus of claim 15, wherein the apparatus is further caused to:
determine whether to suspend the sequential upgrade process based, at least in part, on the status information.

17. An apparatus of claim 16, wherein the apparatus is further caused to:
determine to disable an ability to resume the sequential upgrade process after a predetermined period of time.

18. An apparatus of claim 15, wherein the apparatus is further caused to:
determine that a predetermined number of the one or more components, a predetermined number of the server nodes, or a combination thereof have been upgraded; and
determine that the sequential upgrade process is at least substantially complete is based, at least in part, on the determination with respect to the predetermined number of the one or more components, the predetermined number of the server nodes, or a combination thereof.

19. An apparatus of claim 15, wherein the apparatus is further caused to:
determine a topology of the cluster,
wherein the sequential upgrade process is based, at least in part, on the topology.

20. An apparatus of claim 12, wherein the status information includes at least one of a connectivity status among the cluster, the each server node, the at least one other server, a management server, or a combination thereof; and an operational status of the one or more components, the one or more other components, or a combination thereof.

* * * * *